C. A. WIDMER.
BELT SHIFTING APPARATUS.
APPLICATION FILED APR. 24, 1918.
1,288,339.
Patented Dec. 17, 1918.
3 SHEETS—SHEET 1.
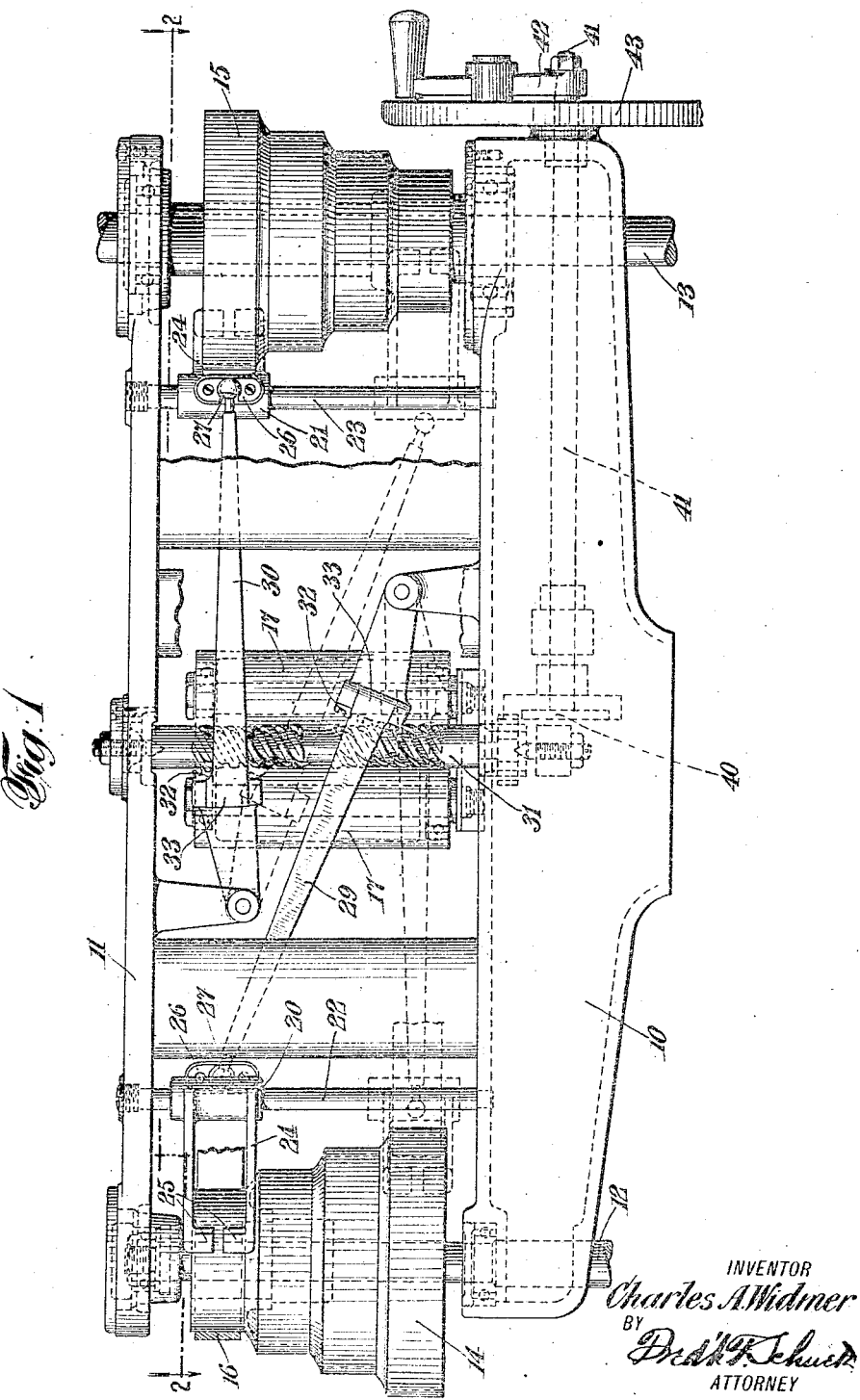
INVENTOR
Charles A Widmer
BY
ATTORNEY

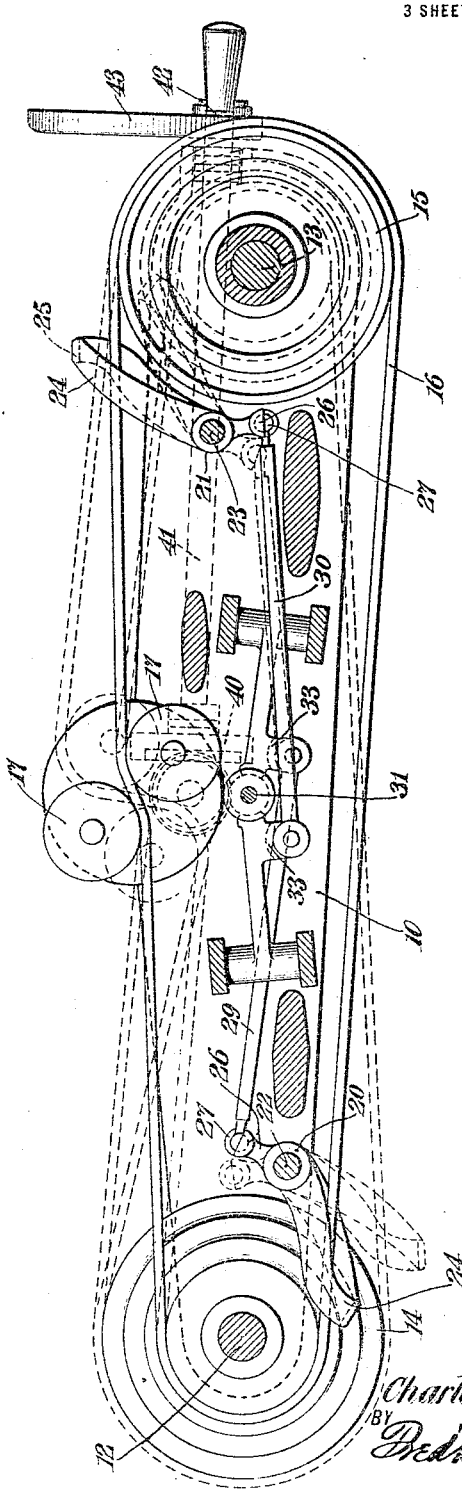

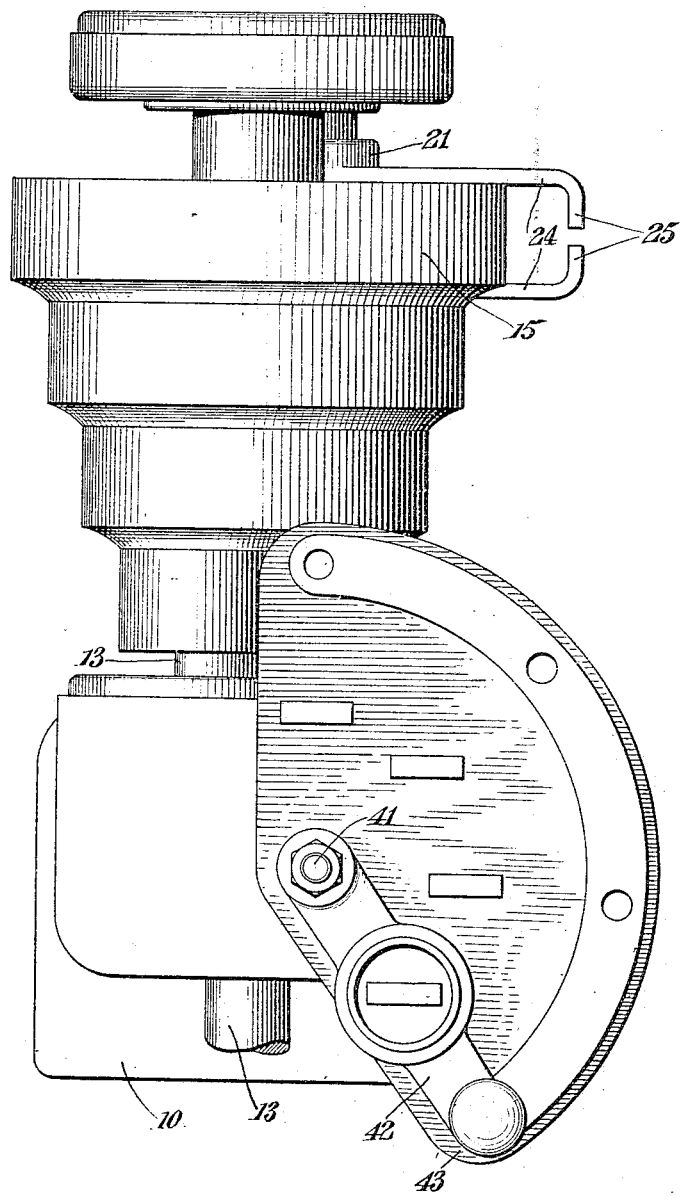

UNITED STATES PATENT OFFICE.

CHARLES A. WIDMER, OF PATERSON, NEW JERSEY.

BELT-SHIFTING APPARATUS.

1,288,339. Specification of Letters Patent. Patented Dec. 17, 1918.

Application filed April 24, 1918. Serial No. 230,551.

*To all whom it may concern:*

Be it known that I, CHARLES A. WIDMER, a citizen of the United States, and a resident of Paterson, in the county of Passaic and State of New Jersey, have invented certain new and useful Improvements in Belt-Shifting Apparatus, of which the following is a specification.

The invention relates to apparatus for effecting the shifting of a belt from one step of its speed pulleys or cones to another, particularly while the same are in operation; and it has for its object to provide means of this character which will insure against the turning over of the belt in the shifting operation, and to secure a positive and instantaneous shift thereof. This object is attained by mechanism hereinafter described, and arranged to operate close to the pulley periphery in all of the stages.

In the accompanying drawings, which illustrate the invention—

Figure 1 is a side elevation of the apparatus.

Fig. 2 is a horizontal section taken on the line 2—2, Fig. 1.

Fig. 3 is a front elevation.

Similar characters of reference designate corresponding parts throughout the several views.

Referring to the drawings, the mechanism is shown supported in a suitable frame, between two separated portions 10 and 11 of which are rotatably mounted the driving shaft 12 and the tool spindle 13. To each of these is secured speed cones 14 and 15 of the desired number of steps, four being herein shown. Power is transmitted from the former to the latter through a belt 16, at one side of which it is acted upon by two idlers 17 so disposed as to contact with the opposite faces thereof, and having their axes displaced in the direction of the travel of the belt. These idlers are designed to take up, automatically, any slack developing in the belt, and particularly during the shifting of same, to assist simultaneously at both pulleys by permitting the belt to yield as it passes over the high points of the said pulleys—the normal and extreme positions which the belt may assume being indicated respectively in full lines and in dotted lines, Fig. 2.

To effect the shifting of the belt from one cone to the next, suitable shippers 20 and 21 are mounted to reciprocate, as well as to oscillate, in manner hereinafter set forth, on corresponding rods 22 and 23, whose axes are parallel to the shaft 12 and spindle 13. The shippers, moreover, are provided with arms 24 extending outwardly to embrace the belt and having inwardly directed fingers 25 extending over the surface of said belt to lock the latter within the shipper.

The shippers have attached thereto a suitable bracket or like member 26 within which operates a ball member 27 or similar device to afford a universal joint between the said shippers and lever arms 29 and 30. These said lever arms are provided with fixed fulcrums by being pivotally attached upon opposite sides 10 and 11 of the frame; the fulcrums, furthermore, being located upon opposite sides of a worm shaft 31, which is mounted midway between the two rods 22 and 23. Two worms are provided on said shaft to engage corresponding wheel segments 32 carried by the respective levers 29 and 30 to swing the same about their fulcrums when the worm is rotated—that is to say, to effect a corresponding reciprocation of the shippers 20 and 21. In order to accommodate this motion of the levers with reference to the corresponding rods, as well as to oscillate the shippers thereon, the same are provided with a hinged connection 33 intermediate the points of fulcrumage and the universal joints 27. This allows of movement of said levers at right angles to the axes of the guide rods 22 and 23, and effects an oscillation of the corresponding shippers, in addition to their reciprocatory movement thereon. In this manner, not only is the motion of the levers properly accommodated for, but the shippers, being free to oscillate upon their rods, are correspondingly moved inwardly or outwardly with reference to the peripheries of the cone pulleys, and are thereby maintained in proximity thereto to resist any tendency to overturning of the belt.

The worm 31 may be rotated in any convenient manner to obtain the desired swing of the lever arms; and, in the present embodiment, obtains its rotation through intermediate mechanism 40 from an actuating shaft 41 mounted in the frame and carrying at the front of the machine a suitable crank or handle 42, adapted to move over a control plate or dial 43 and assume a plurality of positions corresponding to the predetermined possible speed variations.

In this manner, a very simple and effective shifting apparatus is afforded, which is compact and positive in its operation and insured against defective action through over-turning of the belt and other causes.

I claim:

1. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage said belt at each of the pulleys; guides upon which said shippers may be reciprocated and freely oscillate; and means to reciprocate said shippers and simultaneously therewith oscillate the same.

2. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage said belt at each of the pulleys; guides upon which said shippers may be reciprocated and freely oscillate at right angles to the direction of their shipping movement; and means to reciprocate said shippers and simultaneously therewith oscillate the same.

3. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage said belt at each of the pulleys; levers having fixed fulcrums and their ends flexibly united to said shippers; and means to move said levers to reciprocate the shippers and simultaneously therewith oscillate the same.

4. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage the belt at each of the pulleys; guide rods upon which the same are reciprocable and free to oscillate; levers having fixed fulcrums and their ends flexibly united to said shippers; and means to move said levers to reciprocate the shippers.

5. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage said belt at each of the pulleys; levers having fixed fulcrums and their ends flexibly united to said shippers, and provided with a flexible connection intermediate said ends and fulcrums; and means to move said levers to reciprocate the shippers and simultaneously therewith oscillate the same.

6. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage the belt at each of the pulleys; guide rods upon which the same are reciprocable and free to oscillate; levers having fixed fulcrums and their ends flexibly united to said shippers, and provided with a hinged connection intermediate the said ends and fulcrums to allow of motion at right angles to the axes of said guides, and to oscillate the shippers thereon when the latter are reciprocated; and means to move said levers to reciprocate said shippers.

7. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage the belt at each of the pulleys; guide rods upon which the same are reciprocable and free to oscillate; levers having fixed fulcrums and their ends flexibly united to said shippers, and provided with a hinged connection intermediate the said ends and fulcrums to allow of motion at right angles to the axes of said guides, and to oscillate the shippers thereon when the latter are reciprocated, a shaft provided with suitable worms, and means to rotate same; and corresponding worm wheel segments carried by said levers and engaging said worms to move the levers when the said shaft is rotated.

8. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage the belt at each of the pulleys; guide rods upon which the same are reciprocable and free to oscillate; levers having fixed fulcrums and their ends flexibly united to said shippers, and provided with a hinged connection intermediate the said ends and fulcrums to allow of motion at right angles to the axes of said guides, and to oscillate the shippers thereon when the latter are reciprocated, a shaft provided with suitable worms, an oscillatory shaft and intermediate mechanism to communicate the motion of same to said worm shaft; a crank handle upon said oscillatory shaft to effect the oscillation thereof; and a suitable dial or control plate to determine the particular position of the belt with reference to the speed pulleys.

9. In belt shifting apparatus, including a drive shaft and stepped pulley thereon, a tool spindle and stepped pulley thereon, and a belt to transmit power from one to the other: means to shift the belt from one step to a succeeding one, and comprising belt shippers to engage said belt at each of the pulleys; guide rods upon which the same are reciprocable; levers fulcrumed reversely with respect to said shippers and flexibly united therewith; and means located between said levers to simultaneously move the same to effect the reciprocation of said shippers.

10. In belt shifting apparatus: a suitable frame; a drive shaft located at one end thereof and stepped pulley thereon, and a tool spindle located at the opposite end and stepped pulley thereon; a belt to transmit power from one to the other; rods mounted in said frame between said drive shaft and tool spindle and parallel to the axes thereof; a rotatable shaft located midway of said rods and parallel to the axes thereof; levers fulcrumed upon opposite sides of said shaft to opposite sides of the frame, said levers carrying means to be engaged by said rotatable shaft, whereby the said levers may be moved upon rotating the shaft, the levers, furthermore, including a hinged connection between their fulcrums and ends to allow of movement at right angles to the axes of said rods; belt shippers mounted to reciprocate on said rods, extending in one direction to engage the corresponding belt portions, and in the opposite direction to be flexibly united to said levers, whereby, when the latter are moved, the said shippers are correspondingly reciprocated and also oscillated upon said rods.

11. In belt shifting apparatus: a suitable frame; a drive shaft located at one end thereof and stepped pulley thereon, and a tool spindle located at the opposite end and stepped pulley thereon; a belt to transmit power from one to the other; rods mounted in said frame between said drive shaft and tool spindle and parallel to the axes thereof; a shaft provided with suitable worms located midway of said rods and parallel to the axes thereof; levers fulcrumed upon opposite sides of said shaft to opposite sides of the frame, said levers carrying worm wheel segments engaging the corresponding worms of the shaft, whereby the said levers may be moved upon rotating the shaft, the levers, furthermore, including a hinged connection between their fulcrums and ends to allow of movement at right angles to the axes of said rods; belt shippers mounted to reciprocate on said rods, extending in one direction to engage the corresponding belt portions, and in the opposite direction to be flexibly united to said levers, whereby, when the latter are moved, the said shippers are correspondingly reciprocated and also oscillated upon said rods.

Signed at New York in the county of New York and State of New York this 17th day of April A. D. 1918.

CHARLES A. WIDMER.

Copies of this patent may be obtained for five cents each, by addressing the "Commissioner of Patents, Washington, D. C."